(12) United States Patent
Yan et al.

(10) Patent No.: US 12,502,514 B2
(45) Date of Patent: Dec. 23, 2025

(54) VASCULAR ACCESS DEVICE ADAPTER

(71) Applicant: Becton, Dickinson and Company, Franklin Lakes, NJ (US)

(72) Inventors: Bo Yan, Shanghai (CN); Yueqiang Xue, Shanghai (CN); Xiwei Chen, Suzhou (CN); Jonathan Karl Burkholz, Salt Lake City, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 709 days.

(21) Appl. No.: 17/003,202

(22) Filed: Aug. 26, 2020

(65) Prior Publication Data
US 2021/0069483 A1 Mar. 11, 2021

Related U.S. Application Data

(60) Provisional application No. 62/898,291, filed on Sep. 10, 2019.

(51) Int. Cl.
*A61M 39/04* (2006.01)
*A61B 5/15* (2006.01)
(Continued)

(52) U.S. Cl.
CPC ....... *A61M 39/04* (2013.01); *A61B 5/150351* (2013.01); *A61B 5/153* (2013.01);
(Continued)

(58) Field of Classification Search
CPC ........ A61B 5/150351; A61B 5/150992; A61B 5/153; A61J 1/1406; A61J 1/1425;
(Continued)

(56) References Cited

U.S. PATENT DOCUMENTS

| 4,445,896 A | * | 5/1984 | Gianturco | A61M 39/20 604/537 |
| 4,511,359 A | * | 4/1985 | Vaillancourt | A61M 39/14 604/905 |

(Continued)

FOREIGN PATENT DOCUMENTS

| CN | 202105258 U | 1/2012 |
| CN | 202236662 U | 5/2012 |

(Continued)

OTHER PUBLICATIONS

English Translation of Korean Patent Application Publication No. KR20130138023 (Year: 2013).*

(Continued)

*Primary Examiner* — Charles A Marmor, II
*Assistant Examiner* — Andrew E Hoffpauir
(74) *Attorney, Agent, or Firm* — Servilla Whitney LLC

(57) ABSTRACT

A vascular access device adapter allowing for interchangeable connections between separate components of a larger extravascular system while minimizing exposure to non-sterile environments in point-of-care testing and analysis is provided. The vascular access device adapter includes a body having a self-healing puncturable septum secured by an end cap by which hollow small gauge needles may extract or deposit fluid. The adapter device further includes an end cap enclosing the septum, the end cap having ribs which removably secure the adapter to the inner housing of a sample collection device.

20 Claims, 16 Drawing Sheets

(51) Int. Cl.
  *A61B 5/153* (2006.01)
  *A61M 25/06* (2006.01)
  *A61M 39/02* (2006.01)
  *A61M 39/10* (2006.01)

(52) U.S. Cl.
  CPC ... *A61M 25/0606* (2013.01); *A61B 5/150992* (2013.01); *A61M 2039/0202* (2013.01); *A61M 2039/1077* (2013.01)

(58) Field of Classification Search
  CPC .......... A61M 39/04; A61M 2039/1077; A61M 2039/0205; A61M 2039/1072; A61M 5/178; A61M 2005/1403; A61M 25/0606; A61M 2039/0202; A61M 39/10
  See application file for complete search history.

(56) References Cited

U.S. PATENT DOCUMENTS

| | | | |
|---|---|---|---|
| 4,601,703 A | 7/1986 | Herlitze | |
| 4,665,959 A | 5/1987 | Takagi | |
| 5,086,783 A * | 2/1992 | Macors | A61B 5/150244 600/578 |
| 5,088,984 A * | 2/1992 | Fields | A61M 39/14 604/905 |
| 5,215,529 A * | 6/1993 | Fields | A61M 39/14 604/168.01 |
| 5,782,505 A * | 7/1998 | Brooks | A61M 39/12 285/332 |
| 6,277,103 B1 | 8/2001 | Lauer | |
| 6,371,936 B1 | 4/2002 | Heidick | |
| 6,569,125 B2 * | 5/2003 | Jepson | A61M 39/045 604/905 |
| 8,377,010 B2 * | 2/2013 | Harding | A61M 39/045 604/246 |
| 9,205,248 B2 * | 12/2015 | Wu | A61J 1/201 |
| 9,433,768 B2 * | 9/2016 | Tekeste | A61M 5/348 |
| 9,724,505 B2 * | 8/2017 | Williams | A61M 39/1011 |
| 2004/0143226 A1 * | 7/2004 | Marsden | A61B 5/150671 604/272 |
| 2004/0215106 A1 * | 10/2004 | Sampson | A61B 5/150992 604/905 |
| 2005/0010189 A1 * | 1/2005 | Toomey | A61B 5/150389 604/403 |
| 2005/0267384 A1 | 12/2005 | Sauer et al. | |
| 2007/0112311 A1 * | 5/2007 | Harding | A61M 39/045 604/246 |
| 2008/0021381 A1 * | 1/2008 | Lurvey | A61M 39/16 604/87 |
| 2008/0275397 A1 | 11/2008 | Bonnette | |
| 2008/0287867 A1 * | 11/2008 | Yow | A61J 1/1406 604/86 |
| 2012/0059334 A1 * | 3/2012 | Pan | A61M 39/10 604/236 |
| 2014/0309551 A1 * | 10/2014 | Burkholz | A61B 5/150305 600/573 |
| 2015/0005669 A1 | 1/2015 | Burkholz | |
| 2015/0246352 A1 * | 9/2015 | Bullington | A61B 50/33 422/546 |
| 2015/0297453 A1 * | 10/2015 | Kim | A61J 1/2048 285/92 |
| 2016/0158110 A1 * | 6/2016 | Swisher | A61M 39/10 29/525 |
| 2016/0367439 A1 * | 12/2016 | Davis | A61J 1/2096 |
| 2018/0192933 A1 * | 7/2018 | Anitua Aldecoa | A61B 5/150351 |
| 2018/0200145 A1 * | 7/2018 | Sanders | A61J 1/201 |
| 2019/0143094 A1 * | 5/2019 | DeMeritt | A61M 39/24 604/540 |
| 2020/0384256 A1 * | 12/2020 | Hopkinson | A61B 17/1325 |

FOREIGN PATENT DOCUMENTS

| | | | | |
|---|---|---|---|---|
| CN | 202776323 U | | 3/2013 | |
| CN | 209004861 U | | 6/2019 | |
| JP | 2000515797 A | | 11/2000 | |
| JP | 2015066205 A | | 4/2015 | |
| JP | 3219248 U | | 12/2018 | |
| KR | 200424083 Y1 | * | 8/2006 | ............. A61M 5/14 |
| KR | 2013138023 A | * | 12/2013 | ................ A61J 1/14 |

OTHER PUBLICATIONS

KR-200424083-Y1 English Translation (Year: 2006).*
PCT International Search Report and Written Opinion in PCT/US2020/048354 dated Oct. 23, 2020, 11 pages.

* cited by examiner

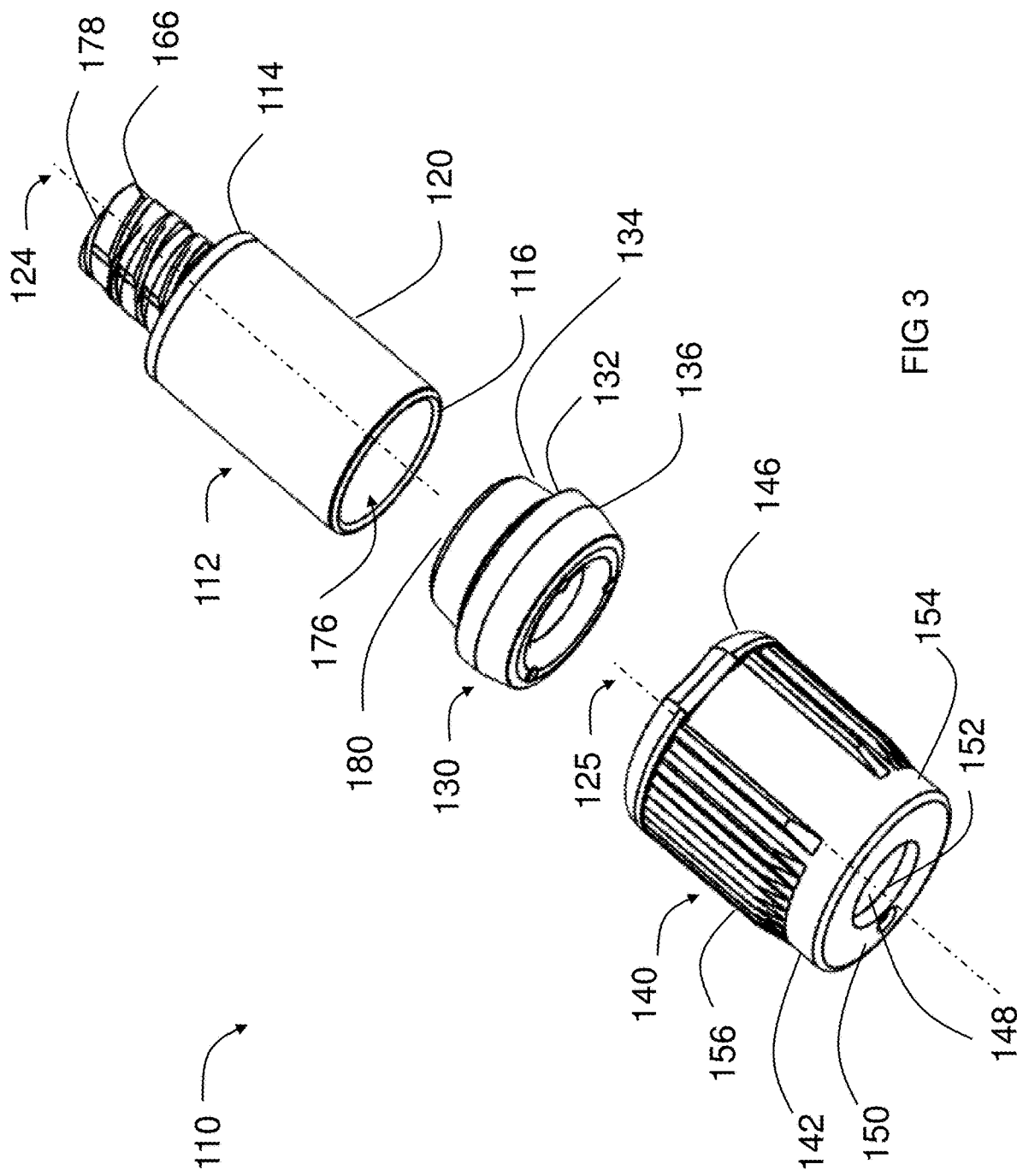

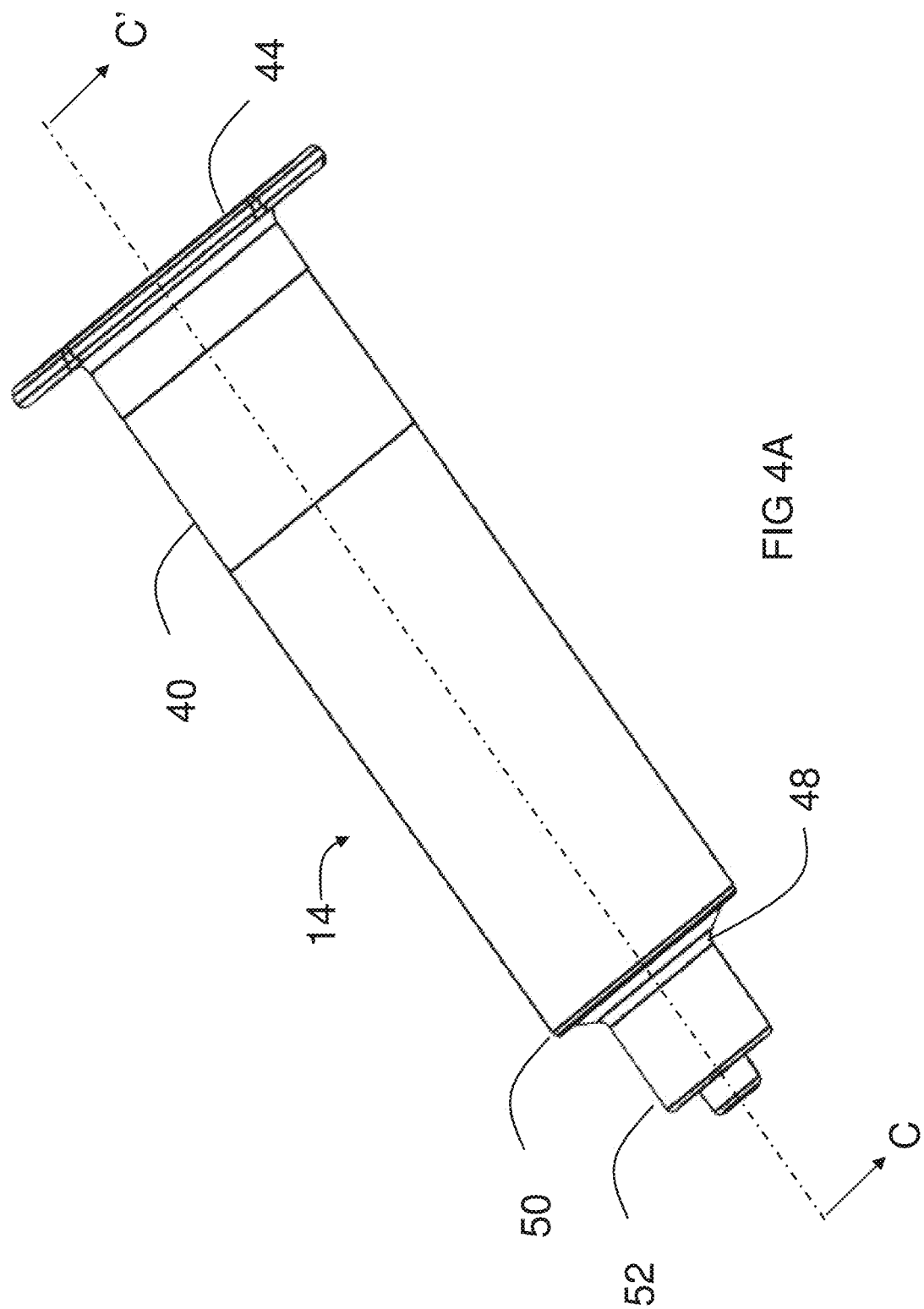

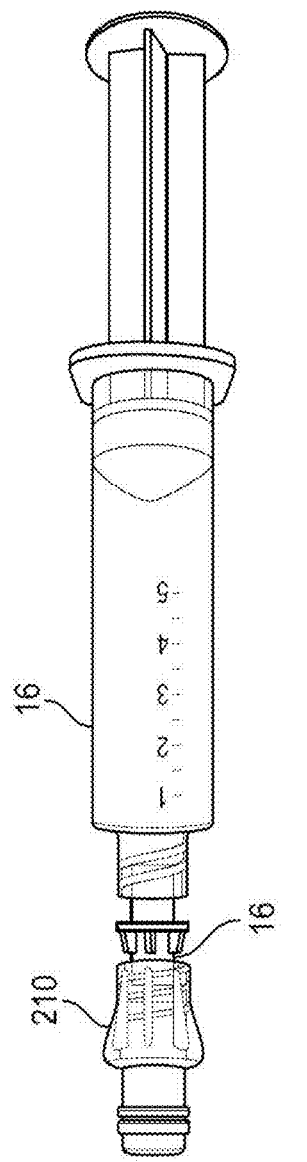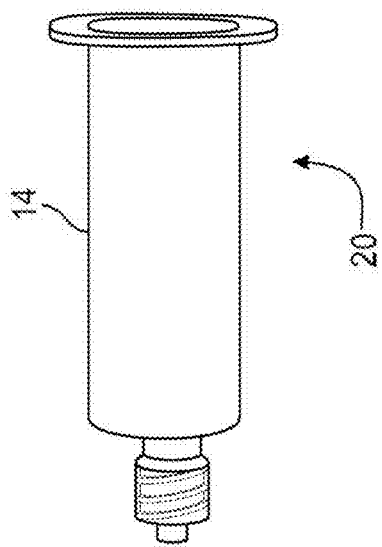
FIG. 5

VASCULAR ACCESS DEVICE ADAPTER

CROSS-REFERENCE TO RELATED APPLICATIONS

This application claims priority under 35 U.S.C. § 119 (e) to U.S. Provisional Application No. 62/898,291, filed Sep. 10, 2019, the disclosures of which are incorporated herein by reference in their entirety.

TECHNICAL FIELD

The present disclosure generally relates to devices, assemblies, and systems adapted for use with vascular access devices, and more particularly, a vascular access device adapter allowing for interchangeable connections between components of a larger extravascular system while minimizing exposure to non-sterile environments during point-of-care testing and analysis.

BACKGROUND

Vascular access devices (VADs) are commonly used therapeutic devices in extravascular systems, which include intravenous (IV) catheters, winged needle sets (WNS), syringes, tubing, high pressure extension tubing, sample container collection devices, blood sample containers and needleless access devices. Such devices may be commonly connected directly to one another with corresponding fittings such as luer locks or luer slips, and may be interchangeably fitted with other devices to facilitate other medical treatments.

By way of example, a clinician may first attach a sample container collection device to a WPN for blood sampling and subsequently flush the WPN using a conventional saline flush syringe. Both the sample container collection device and the conventional flush syringe may have a male fitting while the WPN may have a corresponding female fitting. Similarly, a clinician may first attach a syringe to a needle to extract medication from a vial and subsequently administer the medication intravenously using the same needle. A clinician may alternatively attach the syringe to a catheter to administer the medication. The syringe may have a male fitting while both the needle and the catheter may have a corresponding female fitting.

Such devices may often be disposable and are usually stored in sterile packaging. However, between interchanging of medical devices both the male and female fittings are exposed to a non-sterile environment. Furthermore, blood leak may occur both during interchanging of medical devices and in sequential filling of multiple blood sample containers.

Current practices attempt to limit infections and exposure to nonsterile environments with proper technique such as disinfecting fittings between uses and further saline flushes. There exists a need for a universal disposable device allowing for interchangeable connections between components of a larger extravascular system while minimizing exposure to non-sterile environments.

SUMMARY

In view of the above-described shortcomings within the prior art, a vascular access device adapter allowing for interchangeable connections between separate components of a larger extravascular system while minimizing exposure to non-sterile environments during point-of-care testing and analysis is provided herein. Further details and advantages of the present disclosure will be understood from the following detailed description read in conjunction with the accompanying drawings.

In accordance with one or more embodiment of the present disclosure, a vascular access device adapter is disclosed that includes an end cap at least partially inserted over a cylindrical housing body and a self-healing puncturable septum disposed between the end cap and housing body, creating a seal. A fitting integrally formed to the proximal end of the housing body connects the vascular access device to a separate device having a corresponding fitting. By way of example, the fitting may be a threaded connection, a luer lock, a luer slip, a needleless entry, or a common medical connection.

In accordance with one or more embodiment of the present disclosure, the septum is compressed against the distal end of the housing body and a bottom wall of the end cap. Puncturing the septum through an aperture of the end cap with a hollow small gauge needle allows for fluid to flow from the needle to a separate device through the vascular access device. In accordance with one or more embodiment of the present disclosure, a flush syringe may be removably connected to the vascular access device adapter and the kit may be used to flush a winged needle set by puncuring the septum with a hollow gauge needle of the winged needle set during a blood draw sampling.

In accordance with one or more embodiment of the present disclosure, the end cap may be secured with an interference fit over an outer wall of the housing body. In one or more embodiments, the end cap may be secured with a medical grade adhesive or a threaded connection. The end cap may further include ribs disposed on the outer sidewall which removably secure the device adapter to the inner housing of a sample collection device such as a VACU-TAINER® by an interference fit.

In accordance with one or more embodiment of the present disclosure, the septum may be integrally formed to the housing body without the need for an end cap. In further configurations, the distal portion of the housing body may be configured for needless connections or blunt tip cannulas, allowing for a needleless connection. Such a configuration may include split septums or valve locks, allowing for compatibility with systems such as BD Q-SYTE® Luer Access Split Septum systems, BD INTERLINK® systems and BD SMARTSITE® systems, commercially available from Becton, Dickinson, and Company. Configurations without an end cap may be accompanied by a retainer clip accessory by which the vascular access adapter may be removably inserted and secured to the inner housing of a sample collection device such as a VACUTAINER®, also commercially available from Becton, Dickinson, and Company.

BRIEF DESCRIPTION OF THE DRAWINGS

FIG. 3 illustrates an exploded perspective view of the vascular access device adapter in accordance with the first embodiment of the present disclosure;

FIG. 4A illustrates a perspective view of a sample container collection device as part of the larger extravascular system of the first embodiment;

FIG. 5 illustrates a side view of a vascular access device adapter as part of a larger extravascular system in accordance with a second embodiment of the present disclosure;

DETAILED DESCRIPTION

Figure 1:
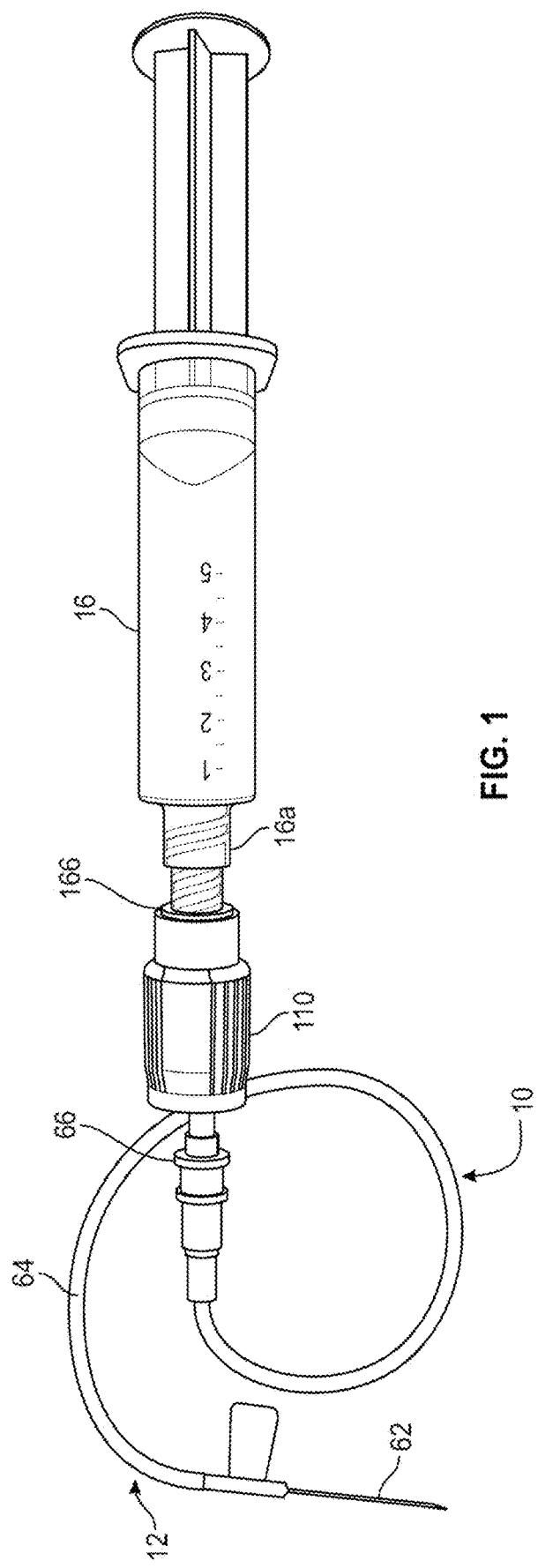
FIG. 1. illustrates a side view of a vascular access device adapter as part of a larger extravascular system in accordance with a first embodiment of the present disclosure.

Before describing several exemplary embodiments of the disclosure, it is to be understood that the disclosure is not limited to the details of construction or process steps set forth in the following description. The disclosure is capable of other embodiments and of being practiced or being carried out in various ways.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting.

The present disclosure relates to a vascular access device adapter 110, allowing for interchangeable connections between components of an exemplary larger extravascular system while minimizing exposure to non-sterile environments during point-of-care testing and analysis. An exemplary extravascular system 10 kit is depicted in FIG. 1. In one or more embodiments, the system includes an exemplary pre-filled flush syringe 16, the vascular access device adapter 110, an exemplary winged needle set 12 and a sample collection tube (not shown), such as a BD VACUTAINER® blood collection tube, commercially available from Becton, Dickinson, and Company. The vascular access device adapter 110 includes a proximal adapter fitting 166 configured to receive additional components of the extravascular system 10. By way of example, in one or more embodiments, the proximal adapter fitting 166 may include a set of threads for coupling the flush syringe 16 to the vascular access device adapter 110.

Figure 2:
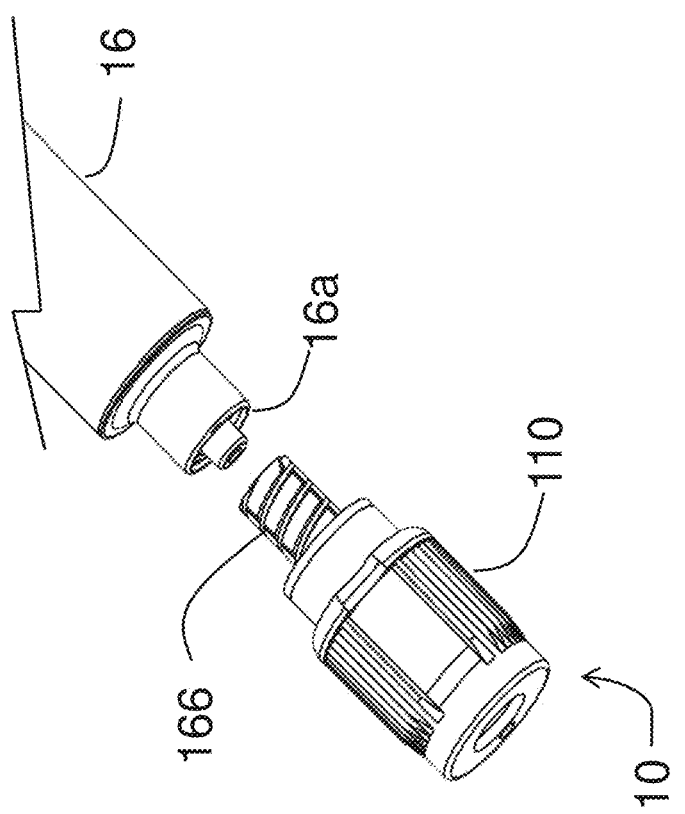
FIG. 2 illustrates a detailed perspective view of the vascular access device adapter in accordance with the first embodiment of the present disclosure.

As shown in FIG. 2, in the present embodiment, the flush syringe includes a female luer fitting 16a connected to the proximal adapter fitting 166 of the vascular access device adapter 110. As shown, the proximal adapter fitting 166 is a male luer fitting, the male and female luer fittings adapted to correspond to one another, allowing fluid communication between the vascular access device adapter 110 and connections between additional components of the extravascular system 10.

Referring back to FIG. 1 and FIG. 4, the exemplary winged needle set 12 may include a blood draw catheter 62, integrated extension tubing 64, a needle hub 66, a hollow small gauge needle (not shown) and a protective elastomeric sleeve (not shown). The integrated extension tubing 64 connecting the blood draw catheter 62 and the needle hub 66. In one or more embodiments, the needle hub 66 housing the hollow small gauge needle 54 with the elastomeric sleeve 46 are integrally joined to the needle hub 66, at least partially covering the hollow small gauge needle 54. A tapered or pointed end of the hollow small gauge needle 54 being configured to puncture a rubber stopper or septum of a vascular access device adapter of one or more embodiments disclosed herein.

During a blood draw, a practitioner may first insert the hollow small gauge needle 54 into the sample collection tube (not shown), piercing a septum (not shown) of the sample collection tube. After extracting a blood sample, a saline flush may be performed by inserting the hollow small gauge needle 54 into a septum 130 of the vascular access device adapter 110. Thus, the vascular access device adapter 110 minimizes additional steps of connecting and disconnecting additional devices and adapters, minimizing the risks of blood exposure and infection. The septum or stopper of the sample collection tube and the vascular access device adapter 110 is self-healing when a needle is removed from the septum or stopper.

Separate, additional components of the extravascular system 10 may further include needles, saline flush syringes, conventional syringes, needleless access systems, IV catheters, sample container collection devices and blood sample containers. Such devices may have generally standardized couplings, ports or fittings. Said components are interchangeable with components of embodiments described herein.

With reference to FIGS. 2 and 3, the vascular access device adapter 110 is described in greater detail. The vascular access device adapter 110 comprises a substantially cylindrical housing body 112, a self-healing puncturable septum 130 and an end cap 140. The septum 130 is disposed within the end cap 140, abutting a distal housing end 116 of the housing body 112. The distal housing end 116 is at least partially inserted in the adapter end cap 140, compressing the septum 130 between the distal housing end 116 and an end cap bottom wall 150 of the end cap 140, creating a seal.

The structure of the cylindrical housing body 112 includes a proximal end 114, a distal end 116, an outer housing sidewall 120 and an aperture defining an interior flow channel 176. The housing body 112 and interior flow channel 176 extending concentrically along an axis 124. Projecting proximally from the proximal end 114 is the previously defined proximal adapter fitting 166.

Figure 7:
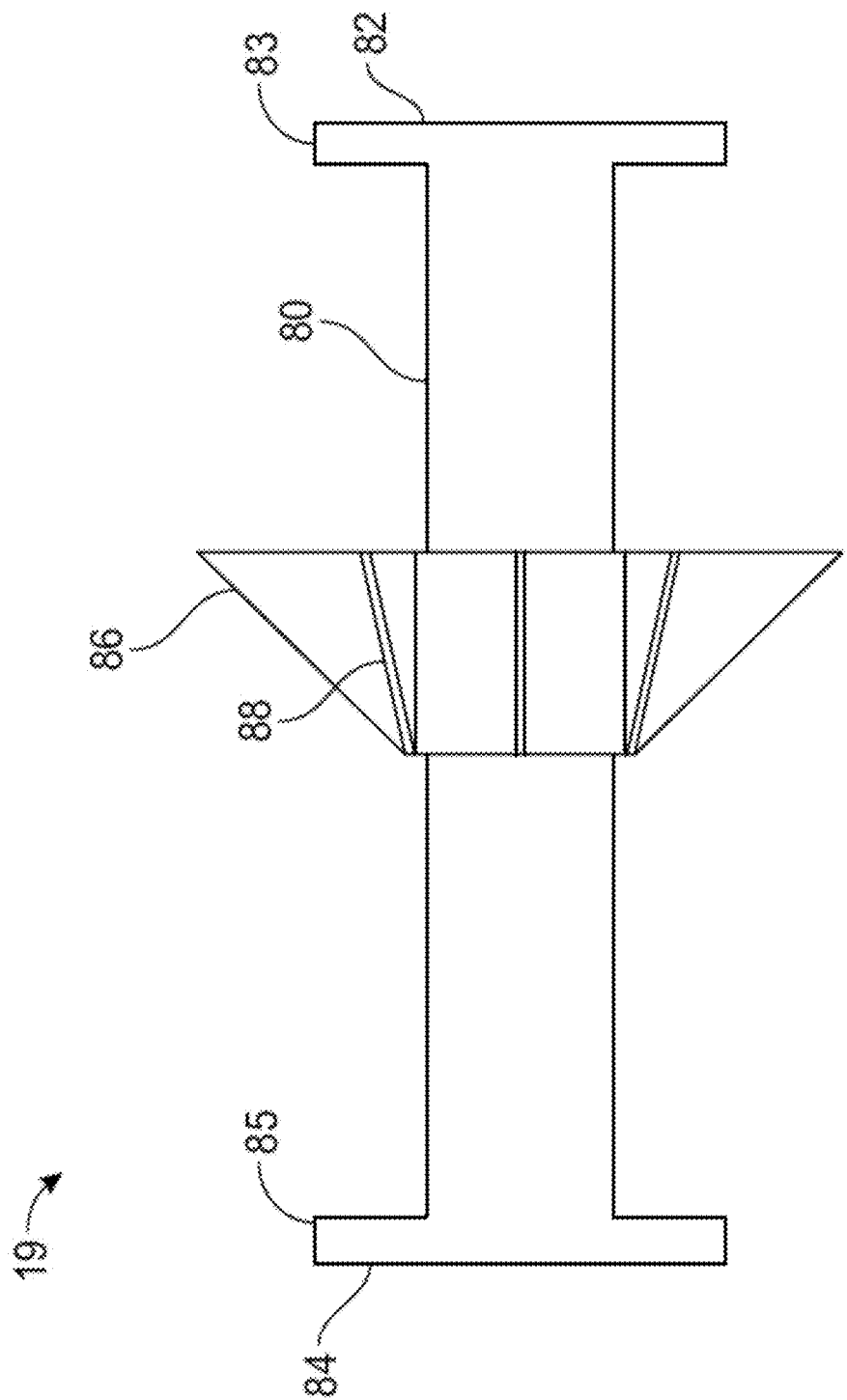
FIG. 7 illustrates a side view of a female-to-female adapter in accordance with a second embodiment of the present disclosure.

While the proximal adapter fitting 166 of the vascular access device adapter 110 in FIGS. 2-3 is a male luer fitting for connecting to the female luer connector of a flush syringe, the proximal adapter fitting 166 may alternatively include a female luer fitting. In the preferred embodiment, the proximal adapter fitting 166 is a threaded, male luer connector, however in alternative embodiments the proximal adapter fitting 166 can be configured as a threaded female luer connector, a female lure slip connector, a male luer slip connector or other connectors known in the art. Said connectors are configured to removably or non-removably mate with components of the extravascular system 10.

Where the particular proximal adapter fitting 166 of the vascular access device adapter 110 is incompatible with a component of the extravascular system 10, an additional female-to-female or male-to-male luer adapter (not shown) may be used to couple the otherwise incompatible devices. Further adapters may include, by way of example, luer-lock-to-luer-slip adapters, luer-lock-to-threaded-connection adapters or any combination thereof. For example, an embodiment of the vascular access device adapter having a male luer lock may be connected to a flush syringe also having a male luer lock with a female-to-female luer adapter 19 as shown in FIG. 7.

Exemplary configurations for couplers, fittings, ports and adapters may include commercially available luer locks, luer slip ports, locking ports, threaded connections, interlocking connection or generally other common medical device fitting known in the art. Further embodiments of the vascular access device 110 adapter may be adapted to utilize such couplers, fittings and ports.

As shown in FIG. 3, the proximal adapter fitting 166 further includes a concentric lumen (not shown) extending therethrough along the axis 124. The flow channel 176 and the concentric lumen 178 being in fluid communication with one another.

The structure of the adapter end cap 140 includes a generally cylindrical end cap body 142 having an inner sidewall (not shown), an outer cap sidewall 154, a distal cap end 148, and a substantially open proximal cap end 146. The open proximal cap end 146 defining an interior cavity extending to a bottom wall 150, the bottom wall 150 being disposed at the distal cap end 148. The bottom wall 150 having a concentric aperture 152 extending therethrough along an axis 125.

In one or more embodiments, a plurality of ribs 156 are disposed radially around the outer cap sidewall 154, the ribs 156 extending at least partially the length of the outer cap sidewall 154. The plurality of ribs 156 are configured to provide a tactile gripping surface for twisting the vascular access device adapter 110. The plurality of ribs 156 are also configured to create removable a friction fit with a barrel of a sample container collection device 14 as explained in further detail below. The friction fit is configured to securely retain the vascular access device adapter 110 within the barrel of the vascular access device adapter 110 during blood draw, thus not requiring a practitioner to manually hold the vascular access device adapter 110 in place.

In one or more embodiments, the adapter end cap 140 further includes a venting feature by which a clinician may prime the coupled flush syringe 16 and vascular access device adapter 110 during a saline flush. Priming is intended to vent and remove any air from an otherwise closed system or to prevent air entering a patient's blood stream during a saline flush.

Referring to FIG. 3, the septum 130 in the present embodiment has a flange shape comprising a generally cylindrical proximal portion 134 and a generally cylindrical distal portion 136. The proximal portion 134 having a smaller diameter than the diameter of the cylindrical distal portion 136. The transition from the proximal portion 134 to the distal portion 136 defining a ridge 132. Other embodiments of the septum may include a generally cylindrical body having a substantially trapezoidal, triangular or tapered cross-section. The material of the septum 130 may generally be an elastic polymer or rubber, creating a barrier which allows for the repeated piercing of conventional needles and the transfer of fluid through the barrier without leakage.

The vascular access device adapter 110 is assembled by pressing the cylindrical housing body 112 at least partially through the open proximal cap end 146, thereby causing compression of the septum 130 against the bottom wall 150 of the end cap 140. Fully assembled, the ridge 132 abuts the distal end 116 of the cylindrical housing body 112 creating a fluid-tight seal. The cylindrical housing body 112 is joined with the end cap 140 by an interference press-fit between the outer housing sidewall 120 of the cylindrical housing body 112 and the inner sidewall (not shown) of the end cap 140. In one or more embodiments, the outer housing sidewall 120 of cylindrical housing body 112 is joined with the inner sidewall (not shown) of end cap 140 using a threaded connection, a locking mechanism or medical grade adhesive, sonic welding or a combination thereof.

Fully assembled, the aperture 152 of the end cap 140 is sufficiently large enough to allow for a conventional needle or, in the present embodiment, the hollow small gauge needle 54 to pierce through the septum 130. Saline fluid may then flow from a greater flow channel 180 through the hollow small gauge needle 54, flushing the winged needle set 12.

As previously described, the proximal adapter fitting 166 of the vascular access device adapter 110 is configured to receive additional components of the extravascular system 10, including conventional syringes, the flush syringe 16 or the exemplary flush syringe 16. Further, the self-healing septum 130 of the access device adapter 110 is configured to receive needles whereby fluid communication is established between the vascular access device adapter 110 and the lumen of the needle being inserted. One such configuration is describe below, in which a connector of the syringe 16 is connected to the proximal adapter fitting 166 of the access device adapter 110 and the vascular access device adapter 110 is inserted into a barrel of the sample collection device 14.

Figure 4B:
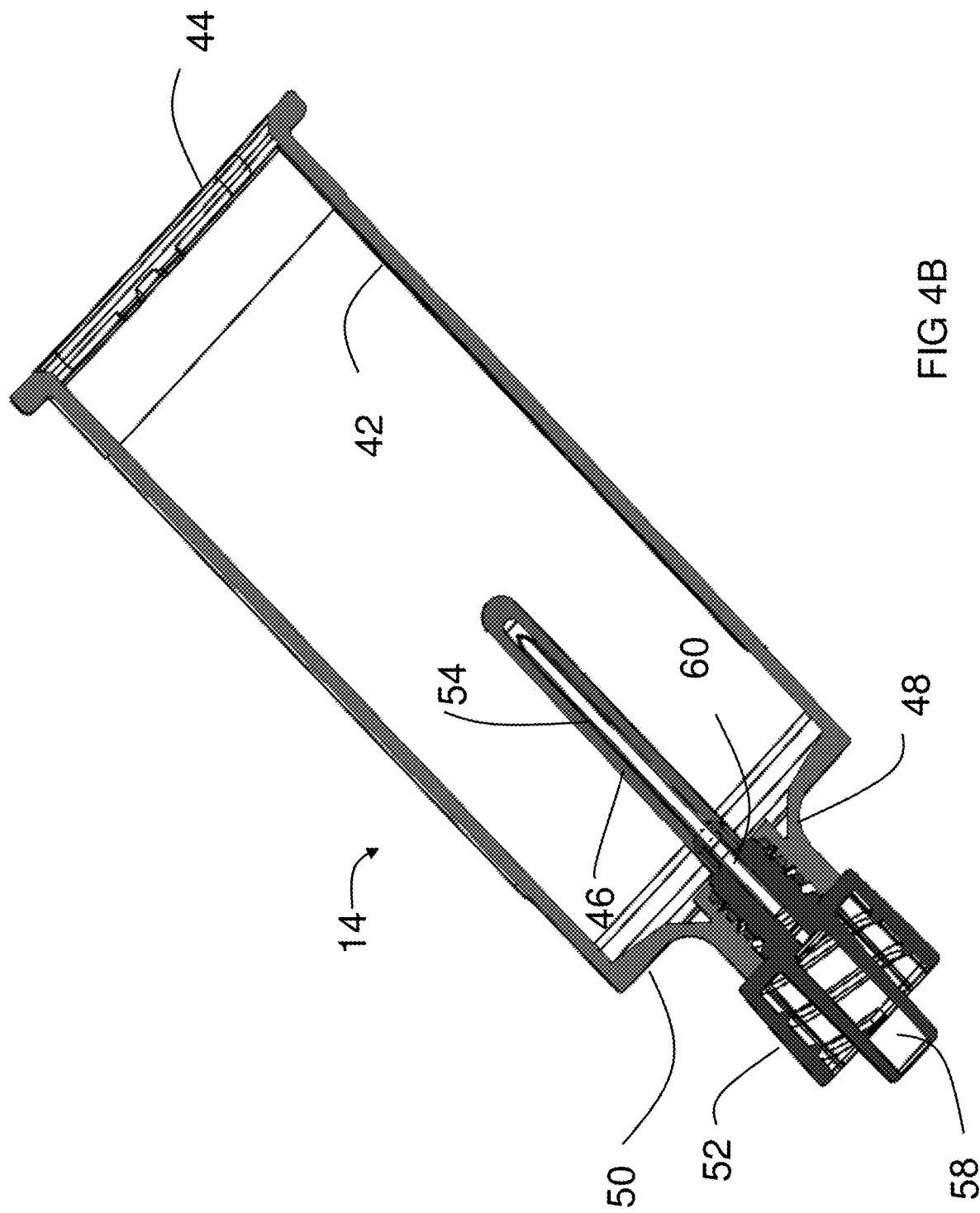
FIG. 4B illustrates a cross sectional view of a sample container collection device as part of the larger extravascular system of the first embodiment.
Figure 4C:
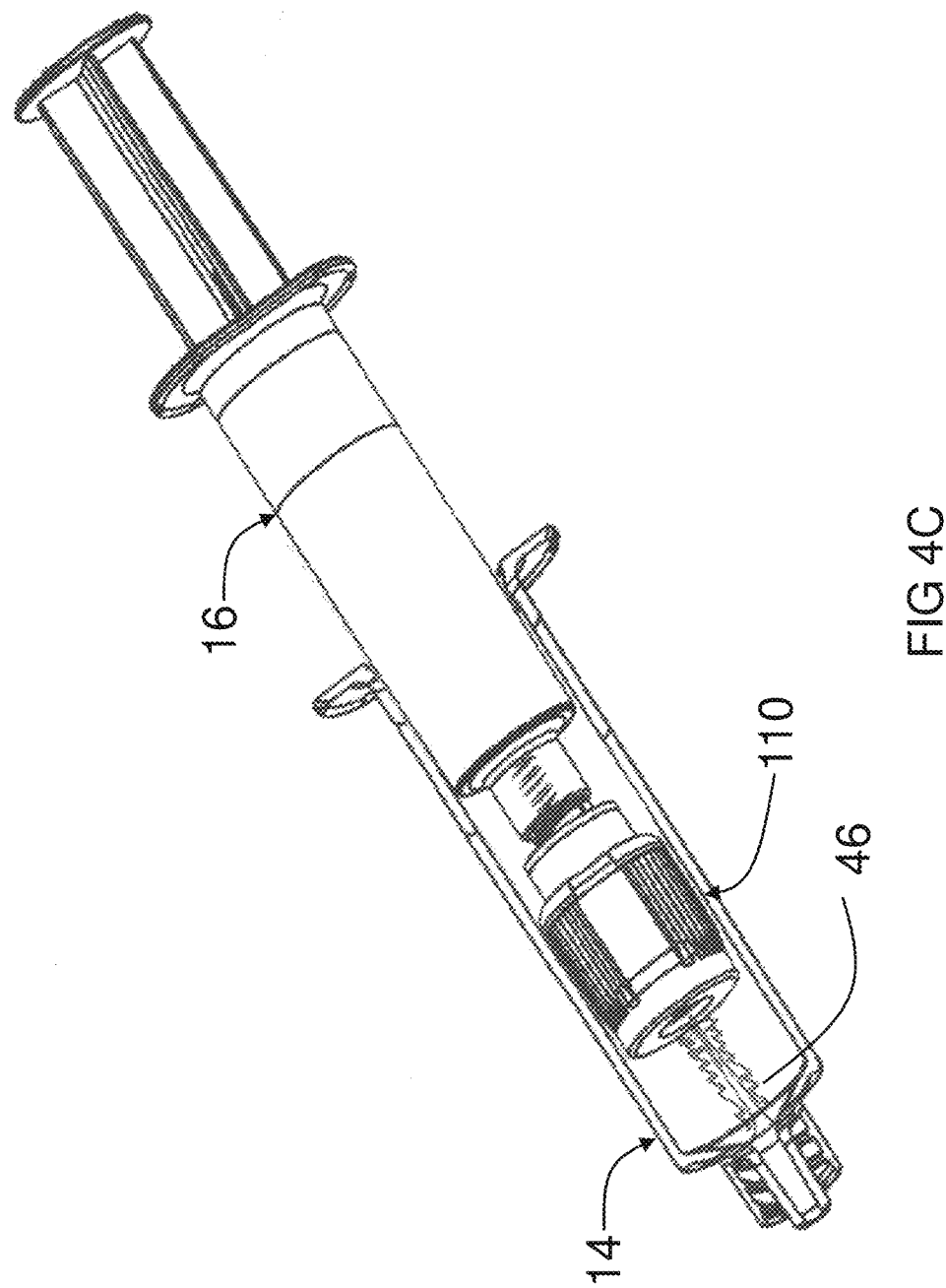
FIG. 4C illustrates a perspective view of the vascular access device adapter disposed within the container collection device as part of the larger extravascular system.

With reference to FIGS. 4A-4C, the sample container collection device 14 includes a generally cylindrical body 40 having an inner sidewall 42, a substantially open first end 44, and second end 48, the substantially open end 44 defines an interior cavity. The second end 48 includes a bottom wall 50 from which a concentric placed fastener 52 extends in a distal direction. The fastener 52 fastens the sample container collection device 14 to blood sample extraction devices such as, but not limited to, catheters or winged needle sets of the extravascular system 10 having corresponding adapters. In the depicted embodiment of FIGS. 4A-4C, the fastener 52 is a female luer lock corresponding to fasteners of blood sample extraction devices of the extravascular system 10.

Exemplary configurations for couplers, fittings, ports and adapters may include commercially available luer locks, luer slip ports, locking ports, threaded connections, interlocking connection or generally other common medical device fitting known in the art. Further embodiments of the fastener 52 may be adapted to utilize such couplers, fittings and ports.

The fastener 52 has a concentric aperture defining a fastener channel (not shown) extending through the bottom wall 50. The bottom wall includes a concentrically placed integrated hollow small gauge needle 54, the hollow small gauge needle 54 having a lumen defining a needle channel 60. The fastener channel 58 and the needle channel 60 being in fluid communication with one another.

In one or more embodiments, the sample container collection device 14 further includes a protective elastomeric sleeve 46 substantially covering the hollow small gauge needle 54. The protective elastomeric sleeve 46 is configured to collapse on itself upon advancement of the vascular access device adapter 110. In one or more embodiments, the elastomeric sleeve 46 is integrally joined to the bottom wall 50. The protective elastomeric sleeve 46 is configured to protect the hollow small gauge needle 54 when not in use. In some embodiments, the protective elastomeric sleeve 46 is also configured to provide a sterile barrier from atmosphere.

As shown in FIG. 4C, following insertion of the vascular access device adapter 110 inside the cylindrical body 40, the protective elastomeric sleeve 46 is compressed, which at least partially exposes the hollow small gauge needle 54. Upon insertion, the hollow small gauge needle 54 punctures the septum 130. The previously described ribs 156 counteract the restorative force of the sleeve 46, holding the device adapter 110 in place within the cylindrical body 40 by the interference fit created between the ribs 156 and the inner wall of the cylindrical body 40. The user is then able to freely manipulate the syringe 16 which the device adapter 110 is attached to without having to simultaneously hold the device in place.

In one or more embodiments, the vascular access device adapter 110 may also be utilized without a sample collection device 14. Any insertion device which also has a pointed hollow gauge needle may directly pierce the septum 130. By way of example, the winged needle set 12 may be utilized, whereby the hollow small gauge needle 54 may pierce the septum 130.

In one or more embodiments, the components of the vascular access device adapter 110, excluding the septum 130, may be made from a rigid polymeric material selected from one or more of a polyester, co-polyester, polycarbonate, polyethylene, polystyrene or polypropylene. In one or more embodiments, the septum 130 may be made from a soft, flexible polymeric material selected from one or more of a thermoplastic elastomer (TPE), thermoplastic polyurethane (TPU), thermoplastic vulcanizate elastomer (TPV), olefin block copolymers (OBC), polyisoprene, silicone or rubber.

Referring now to FIGS. 5-8B, an exemplary extravascular system 20 of a second embodiment is depicted. The system includes a vascular access device adapter 210 in accordance with a second embodiment, a female-to-female adapter 19 and the syringe 16 as previously described. The system may further include elements from the first embodiment, including the sample container collection device 14 and the winged needle set 12.

As previously described, while the exemplary extravascular system of a second embodiment includes the female-to-female adapter 19, where further embodiments comprise a male and a female connector, said female-to-female adapter 19 is not required and the syringe 16 may be directly connected to the vascular access device adapter 210.

Figure 6:
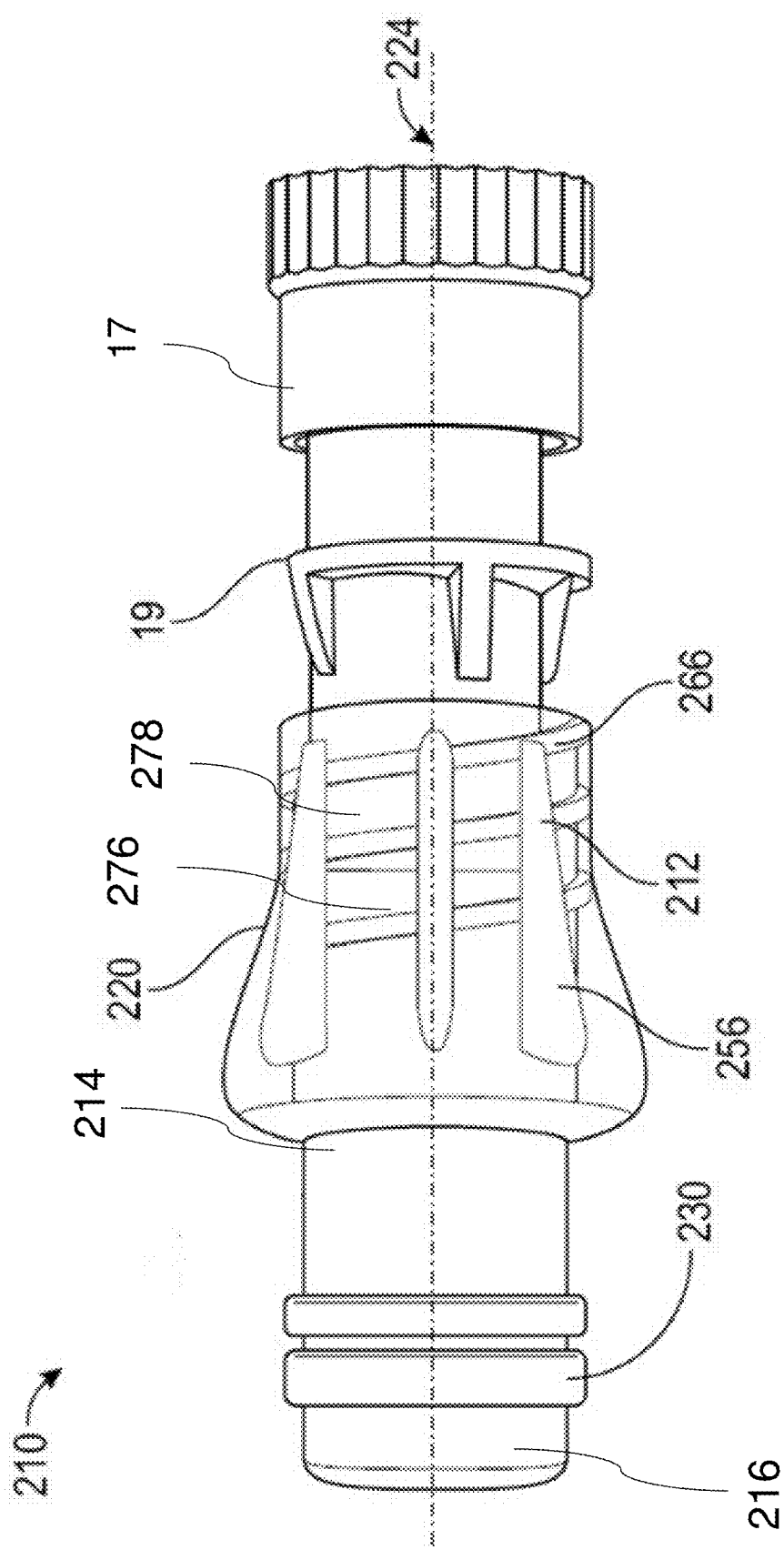
FIG. 6 illustrates a side view of the vascular access device adapter in accordance with the second embodiment of the present disclosure.

As shown in FIG. 6, the vascular access device adapter 210 comprises a substantially cylindrical housing body 212 and a self-healing puncturable septum 230. The septum 230 is integrally joined onto a distal housing end 216 of the housing body 212, creating a fluid seal. The material of the septum 230 may generally be an elastic polymer or rubber, creating a barrier which allows for the repeated piercing of conventional needles and the transfer of fluid through the barrier.

The structure of the cylindrical housing body 212 includes a proximal end 214, the distal end 216, an outer housing sidewall 220 and an aperture defining an interior flow channel (not shown). The housing body 212 and interior flow channel (not shown) extend concentrically along an axis 224. Projecting proximally from the proximal end 214 is a proximal adapter fitting 266. The proximal adapter fitting 266 further includes a concentric lumen (not shown) extending therethrough along the axis 224. The interior flow channel 276 and the concentric lumen 278 are in fluid communication.

Exemplary configurations for couplers, fittings, ports and adapters may include commercially available luer locks, luer slip ports, locking ports, threaded connections, interlocking connection or generally other common medical device fitting known in the art. Further embodiments of the proximal adapter fitting 266 may be adapted to utilize such couplers, fittings and ports.

In one or more embodiments, the cylindrical housing body 212 may further include a venting feature by which a clinician may prime the coupled flush syringe 16 and vascular access device adapter 210 during a saline flush as described. Priming is intended to vent and remove any air from an otherwise closed system or to prevent air entering a patient's blood stream during a saline flush.

In one or more embodiments, the cylindrical housing body 212 of the vascular access device adapter 210 may further include a ridge 256, disposed radially around the outer sidewall 220. The ridge 256 is configured to aid in manipulation of the vascular access device adapter 210 and, specifically, the surface of the ridge 256 is aids in twisting, threading, pulling or pushing the vascular access device adapter 210.

In one or more embodiments, the ridge 256 extends outward from the cylindrical housing body 212 and is configured to interlock lock onto a jaw set 310 of a retainer clip 300 described in further detail below.

As shown in FIGS. 6 and 7, the female-to-female adapter 19 is configured to couple a distally located female connector 17 of the flush syringe 16 to the proximal adapter fitting 266 of the vascular access device adapter 210 where connection is otherwise not possible due to incompatibility of the distally located female connector 17 of the flush syringe 16 and the proximal adapter fitting 266 of the vascular access device adapter 210. The female-to-female adapter 19 comprises a substantially cylindrical body 80 having a proximal portion, a medial portion and a distal portion. The proximal portion has a proximal male connector 82 configured to connect to the distally located female connector 17 of the flush syringe 16 and the distal portion has a distal male connector 84 configured to connect to the proximal adapter fitting 266 of the vascular access device adapter 210. In one or more embodiments, the medial portion has a radial protrusion 86 extending from the cylindrical body 80. In one or more embodiments, the radial protrusion 86 further includes a plurality of longitudinal ribs 88. The radial protrusion 86 and the plurality of longitudinal ribs 88 are configured to aid in manipulation of the female-to-female adapter 19. By way of example, the plurality of longitudinal ribs 88 aid in application of a rotational or torsional force to uncouple threaded or twist-lock connections. In one or more embodiments, the radial protrusion 86 may further be in the shape of a trapezoid or a winged protrusion. The shape aids in pushing or pulling the female-to-female adapter 19 against components.

In the depicted female-to-female adapter 19, the proximal male connector 82 further includes at least one proximal thread 83 and the distal male connector 84 further includes at least one distal thread 85. The least one proximal thread 83 and the distal thread 85 are configured to threadedly couple with female connectors.

As previously described, the ridge 256 of the vascular access device adapter 210 extends outward from the cylindrical housing body 212 and is configured to interlock onto a jaw set 310 of a retainer clip 300.

Figure 8A:
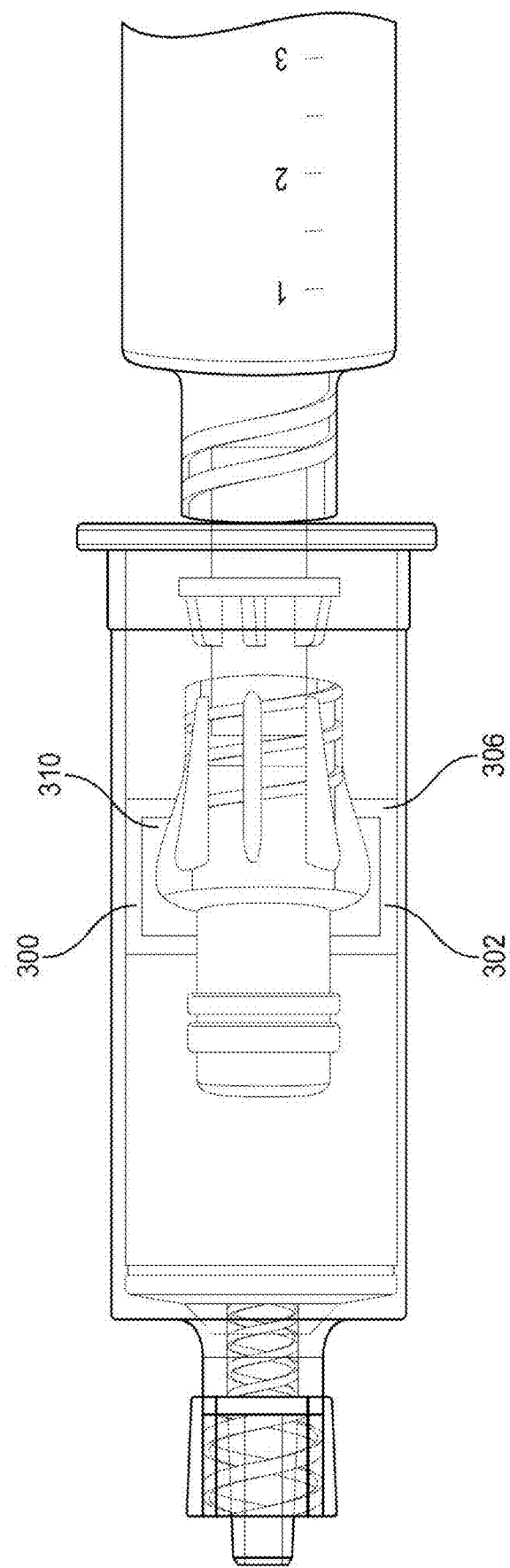
FIG. 8A illustrates a side cross sectional view of a sample container collection device as part of the larger extravascular system of the second embodiment.
Figure 8B:
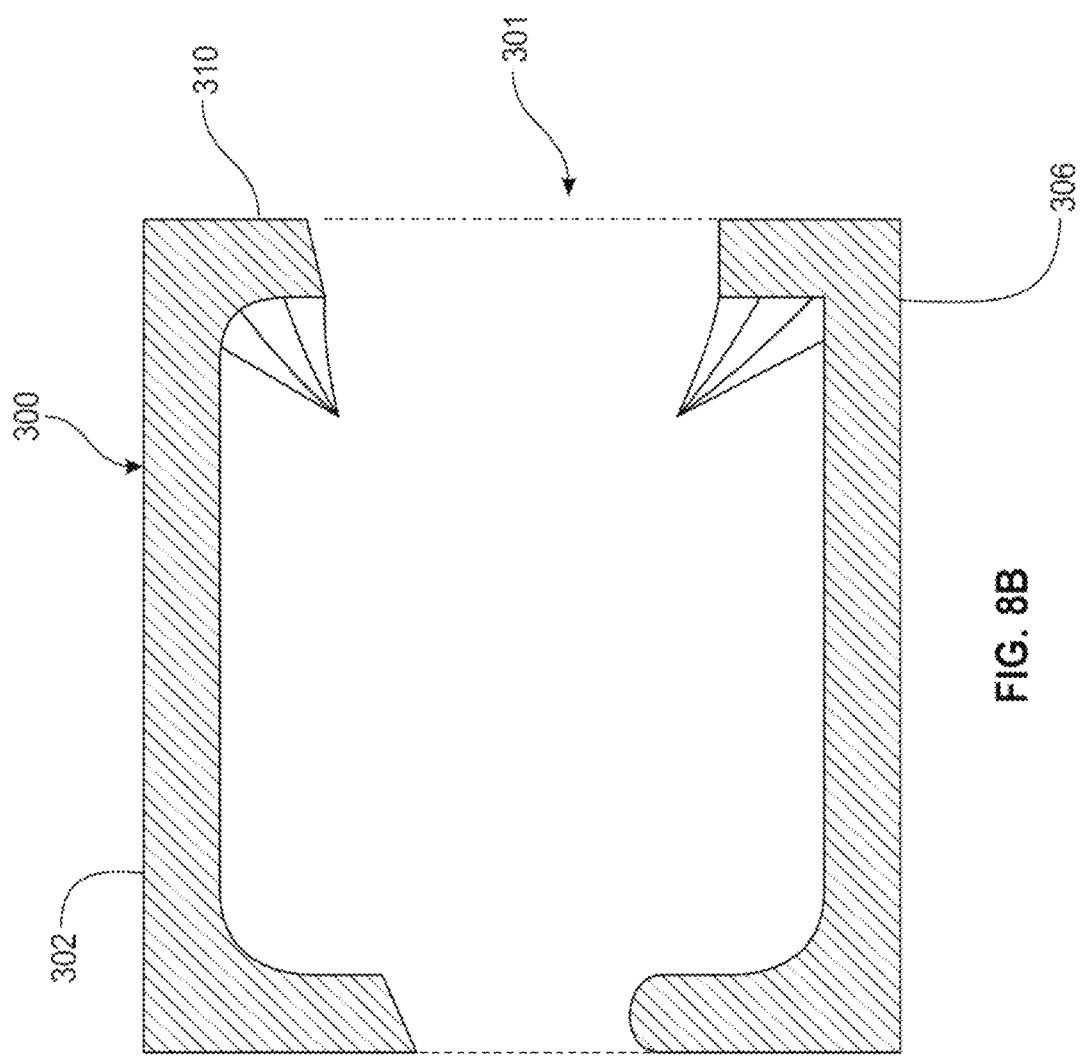
FIG. 8B illustrates a perspective view of a retainer clip as part of the larger extravascular system of the second embodiment.

As shown in FIGS. 8A and 8B, the retainer clip 300 includes a substantially cylindrical clip body 302, an aperture 301 extending therethrough and the jaw set 310 disposed on a proximal end 306. The jaw set 310 is oriented towards the center of the cylindrical clip body 302. The retainer clip 300 may be inserted into the cylindrical body 40 of the sample container collection device 14 creating an interference fit. The vascular access device adapter 210 attached to the syringe 16 may then be inserted, the jaw set 310 locking the vascular access device adapter 210 and the retainer clip 300, counteracting the restorative force of the sleeve 46, holding the device adapter 210 in place within the cylindrical body 40 by the interference fit created between the cylindrical clip body 302 and the inner wall of the cylindrical body 40. The user is then able to freely manipulate the separate device which the device adapter 210 is attached to without having to simultaneously hold the device in place. Removal of the vascular access device adapter 210 in the present embodiment also removes the retainer clip 300; however in alternative embodiments the jaws set 310 may have sufficient elastic deformation to allow removal of the vascular access device adapter 210 without removing the retainer clip 300. Alternate embodiments of the retainer clip 300 may not have jaws. The locking may be achieved by an interference fit, a locking mechanism or a set of threads.

Figure 9:
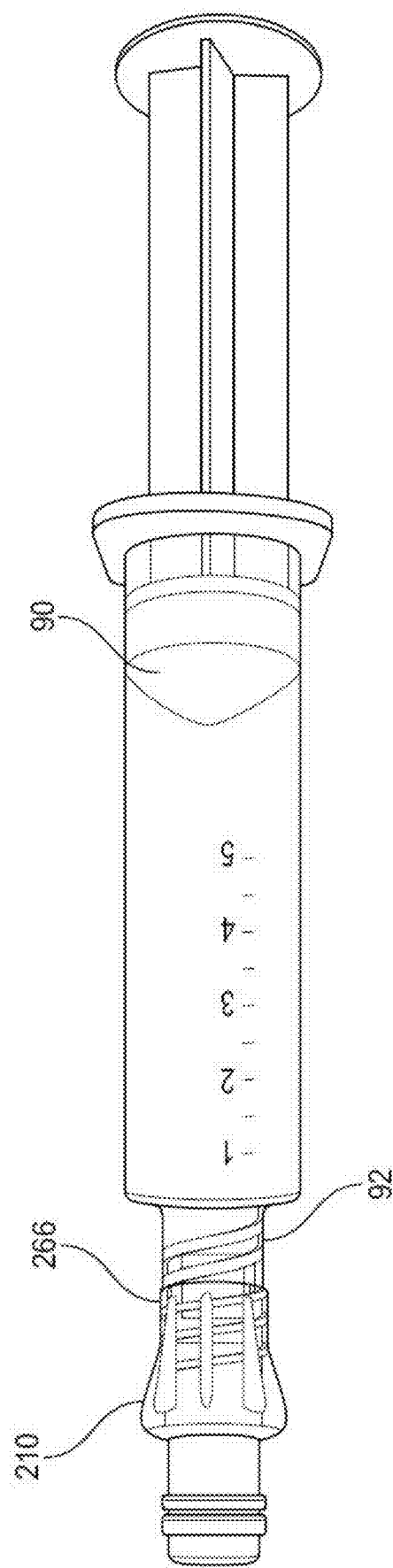
FIG. 9 illustrates a side view of the vascular access device adapter in accordance with a third embodiment of the present disclosure.

FIG. 9 depicts the vascular access device adapter 210 having the proximal adapter fitting 266 directly connected to a male fitting 92 of an exemplary conventional syringe 90. Where the proximal adapter fitting 266 and the male fitting 92 are compatible, the female-to-female adapter 19 is not required.

Figure 10:
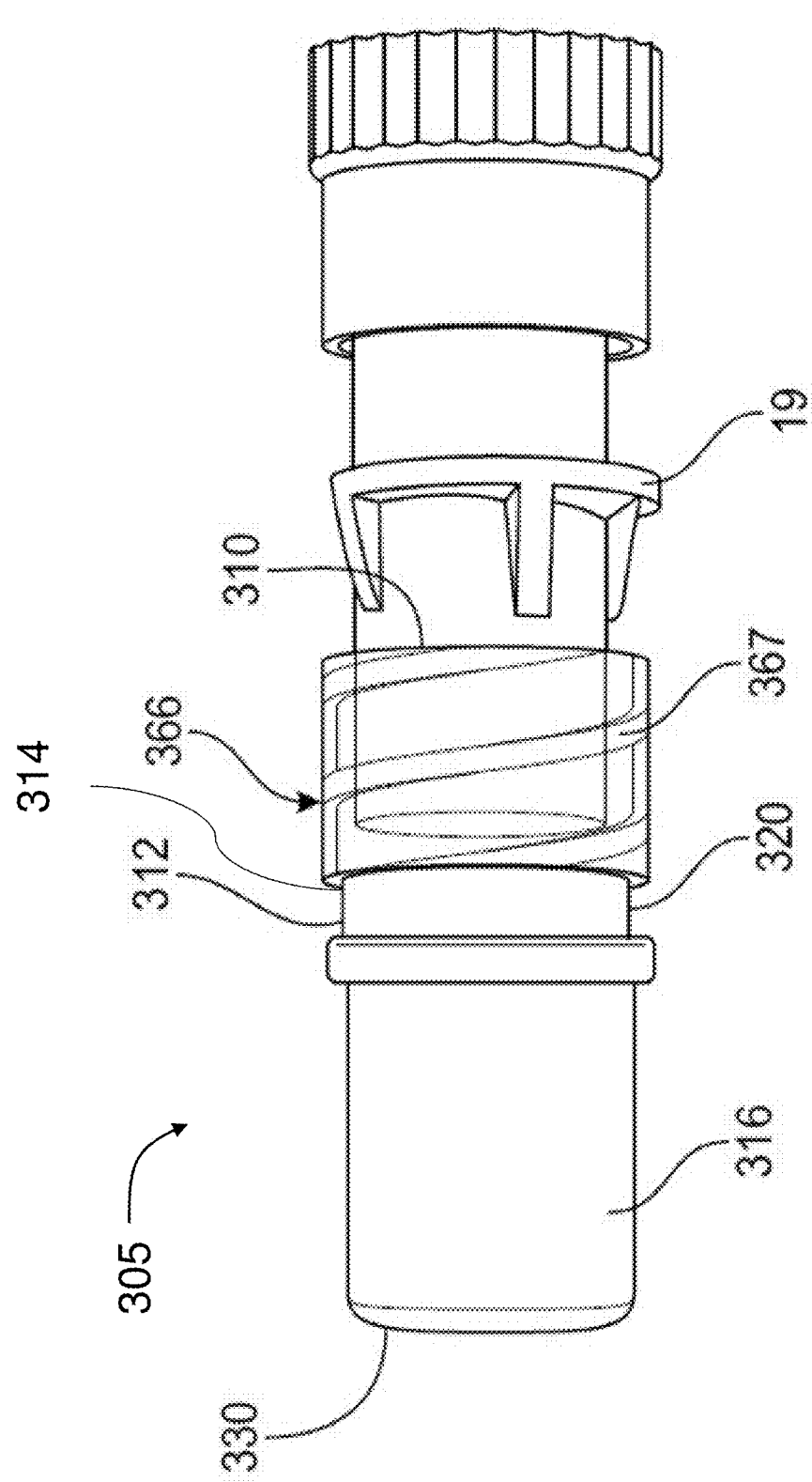
FIG. 10 illustrates side views of a vascular access device adapter in accordance with a fourth embodiment of the present disclosure.

FIG. 10 illustrates yet another embodiment of a vascular access adapter 305 connected to the female-to-female adapter 19 of one of the embodiments described herein. The vascular access device adapter 305 comprises a substantially cylindrical housing body 312 and a self-healing puncturable septum 330. The septum 330 is integrally joined and substantially covers a distal housing end 316 of the housing body 312, creating a fluid seal. The material of the septum 330 may generally be an elastic polymer or rubber, creating a barrier which allows for the repeated piercing of conventional needles and the transfer of fluid through the barrier.

The structure of the cylindrical housing body 312 includes a proximal end 314, the distal end 316, an outer housing sidewall 320 and an aperture defining an interior flow channel (not shown). The housing body 312 and interior flow channel (not shown) extend concentrically. Projecting proximally from the proximal end 314 is a proximal adapter fitting 366. The proximal adapter fitting 366 further includes a concentric lumen (not shown) extending therethrough. In the depicted embodiment, the proximal adapter fitting 366 includes a plurality of threads 367 configured to mate with the at least one distal thread 85 of the female-to-female adapter 19.

Exemplary configurations for couplers, fittings, ports and adapters may include commercially available luer locks, luer slip ports, locking ports, threaded connections, interlocking connection or generally other common medical device fitting known in the art. Further embodiments of the proximal adapter fitting 366 may be adapted to utilize such couplers, fittings and ports.

In one or more embodiments, the cylindrical housing body 312 may further include a venting feature by which a clinician may prime the coupled flush syringe and vascular access device adapter 305 during a saline flush as described. Priming is intended to vent and remove any air from an otherwise closed system or to prevent air entering a patient's blood stream during a saline flush.

In one or more embodiments, a plurality of ribs 368 extends from the proximal end 314 partially along the housing body 312. The plurality of ribs 368 are configured to aid in manipulation of the vascular access device adapter 305, and more specifically gripping and twisting or threading the vascular access device adapter 305.

Figure 11:
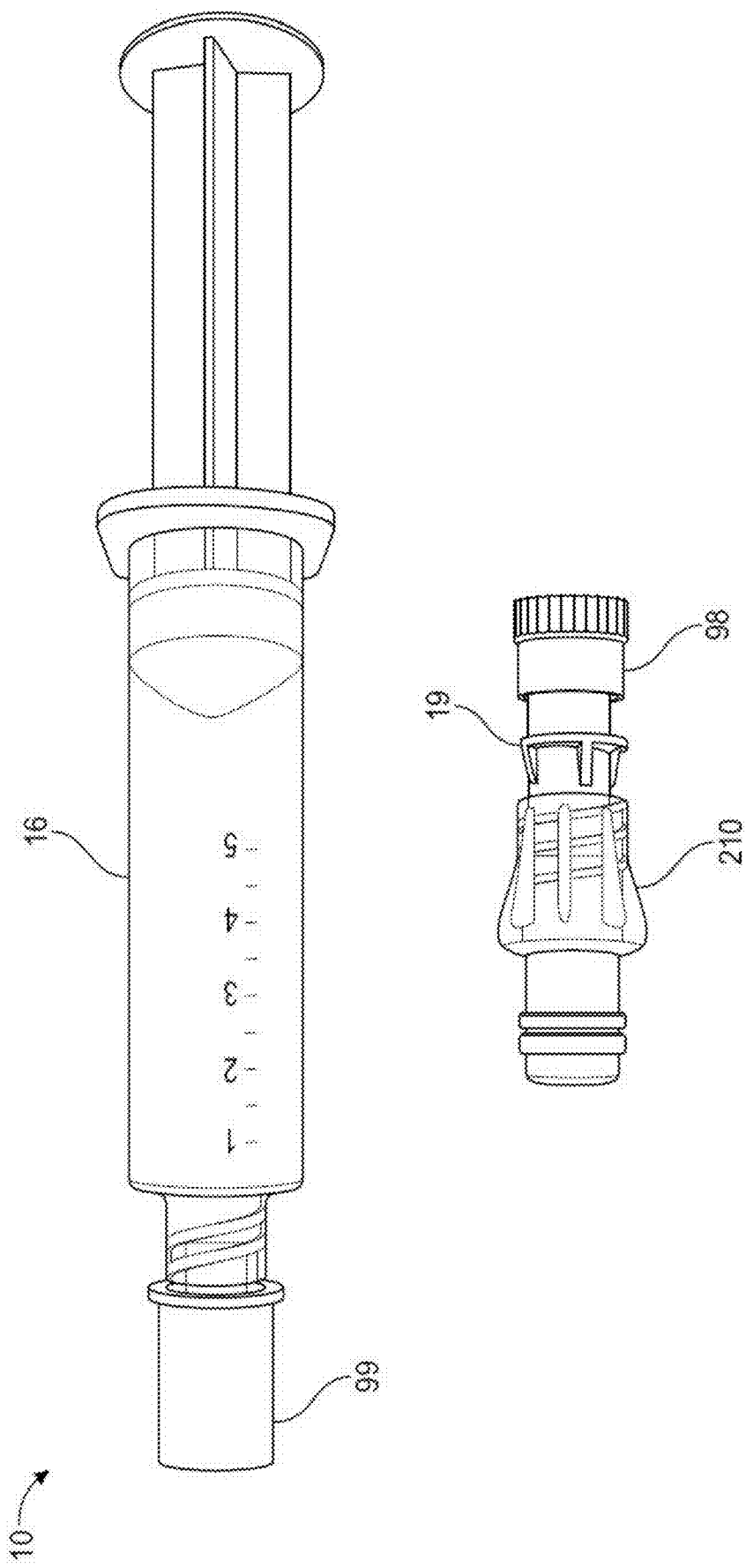
FIG. 11 illustrates a extravascular system kit in accordance with one or more embodiments of the present disclosure.

FIG. 11 depicts the extravascular system 10 kit in which components described in the embodiments herein may be packed together in sterile blister packaging. In the depicted embodiment, the vascular access device adapter 210 is connected to the female-to-female adapter 19. In one or more embodiments, the proximal end 83 of the female-to-female adapter 19 is covered with a disposable cap 98. The disposable cap 98 is configured to maintain a sterile environment for the otherwise exposed proximal end 83 of the female-to-female adapter 19. Likewise, a second disposable cap 99 may cover a provided flush syringe 16 of one or more embodiments described herein.

Figure 12A:
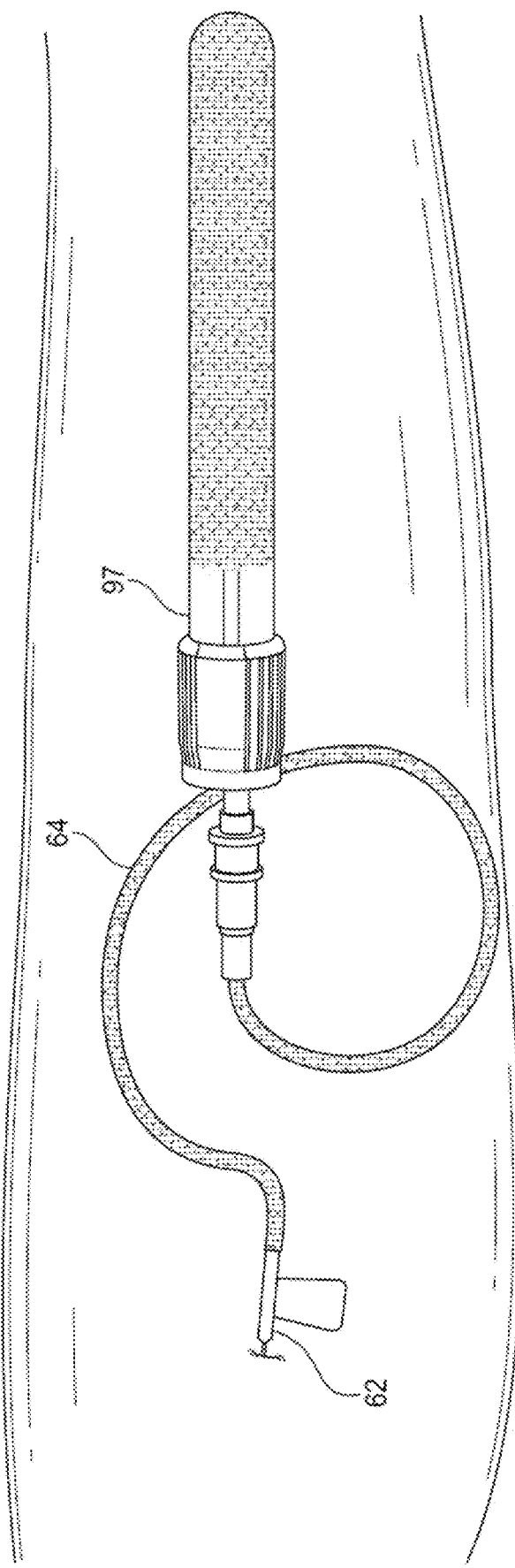
FIGS. 12A and 12B illustrate a method of use of the vascular access device adapter in accordance with one or more embodiments of the present disclosure.
Figure 12B:
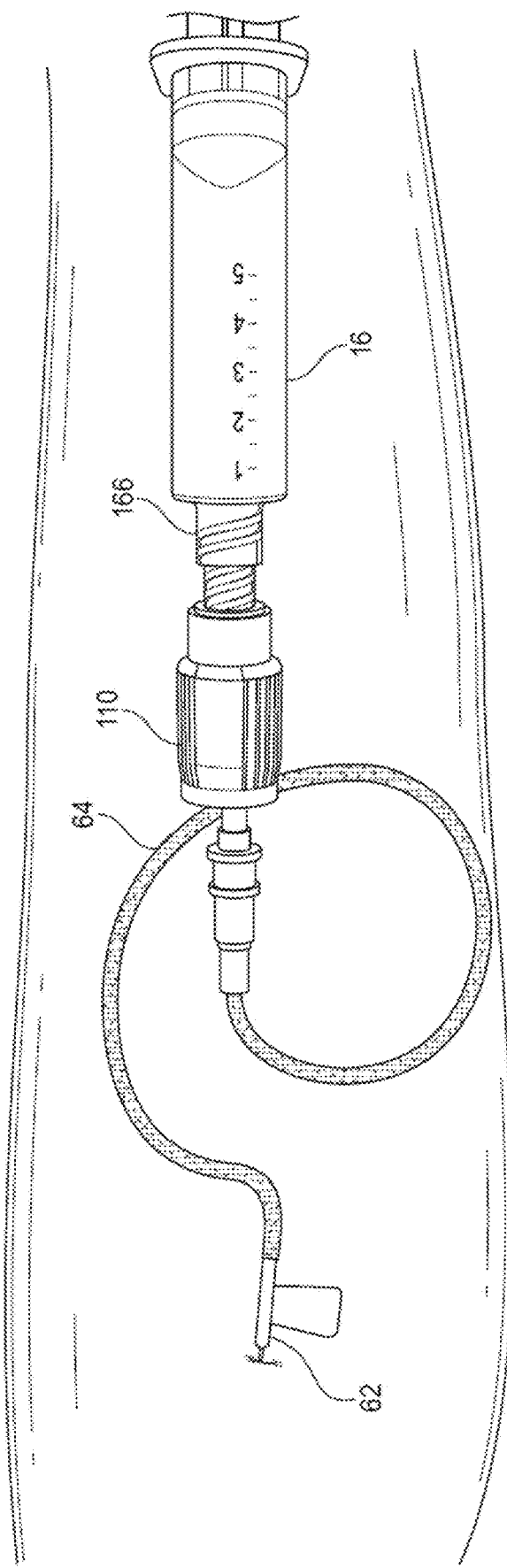

As shown in FIGS. 12A and 12B, a method of flushing a winged needle set 12 is described herein. The method comprises inserting the blood draw catheter 62 of embodiments described herein into the skin of a patient. The method further comprises inserting the hollow small gauge needle (not shown) of the winged needle set 12 into a septum (not shown) of a blood sample container 97 and withdrawing a blood sample. The method further comprises removing the blood sample container 97 and inserting the hollow small gauge needle (not shown) of the winged needle set 12 into the septum (not shown) of the vascular access device adapter 110 of one or more embodiments described herein. The proximal adapter fitting 166 proximal adapter fitting 166 of the vascular access device adapter 110 is connected to the syringe 16, and the method further includes flushing the integrated extension tubing 64 of the winged needle set 12. The method further comprises removing the hollow small gauge needle (not shown) from the proximal adapter fitting 166 and sealing or clamping the winged needle set 12. In one or more embodiments, the method further comprises removing the winged needle set 12 from the insertion site on the patient's skin.

In further embodiments, the distal end of a vascular access device adapter may be configured to be compatible with needless or blunt-tip connections such as a BD Q-SYTE® Luer Access Split Septum, also commercially available from Becton, Dickinson, and Company. In even further embodiments, the distal end of a vascular access device adapter may be configured to be compatible with needless or blunt-tip connections such as a BD INTERLINK® system, also commercially available from Becton, Dickinson, and Company. In even further embodiments, the distal end of a vascular access device adapter 210 may be configured to be compatible with needless or blunt-tip connections such as a BD SMARTSITE® system, also commercially available from Becton, Dickinson, and Company.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

What is claimed is:

1. A vascular access device adapter comprising:
    a cylindrical housing body, the cylindrical housing body having a proximal end, a distal end, an outer housing sidewall and an aperture defining an interior flow channel,
    a fitting integrally formed to the proximal end of the cylindrical housing body and projecting proximally from the cylindrical housing body, the fitting having a concentric lumen defining an interior flow path of the fitting, the fitting connecting to a corresponding fitting of a separate access device;
    an end cap having a concentric proximal opening, a distal wall, an inner sidewall, an outer sidewall, and a concentric aperture extending from the proximal opening to the distal wall, the concentric aperture defining an end cap interior;
    the distal wall having a concentric hole extending therethrough;
    a cylindrical self-healing puncturable septum having a proximal portion and a distal portion, the proximal portion having a smaller diameter than a diameter of the distal portion;
    a transition from the proximal portion to the distal portion defining a ridge,
    wherein the interior flow channel and the concentric lumen define a greater flow channel;
    wherein the cylindrical housing body is disposed within the end cap, the inner sidewall of the end cap and the outer housing sidewall of the cylindrical housing body creating a fitment;
    wherein the cylindrical self-healing puncturable septum is disposed on the distal end of the housing body and within the concentric aperture of the end cap, the end cap enclosing the cylindrical self-healing puncturable septum, the ridge abutting the distal end of the cylindrical housing body, creating a seal,
    wherein the end cap is configured to removably secure the vascular access device adapter to an inner housing of a sample container collection device and the end cap further comprises a plurality of ribs disposed on the outer sidewall of the end cap, the plurality of ribs creating a slip fit with an inner wall of the sample container collection device; and
    a female-to-female adapter configured to couple a female connector of a vascular access device to the fitting integrally formed to the proximal end of the cylindrical housing body of the vascular access device adapter, the female-to-female adapter comprising a cylindrical body having a proximal portion, a medial portion and a distal portion, the proximal portion includes a male connector configured to connect to the female connector of the vascular access device, the medial portion includes a radial protrusion extending from the cylindrical body, and the distal portion includes a male connector that mates with the fitting of the vascular access device adapter.

2. The vascular access device adapter of claim 1, wherein the fitting is a locking fitting, the locking fitting connecting to a corresponding locking fitting of a separate access device;
    wherein the vascular access device adapter and the separate access device are removably secured by pressing the locking fitting of the vascular access device adapter into the corresponding locking fitting of the separate access device and twisting the vascular access device adapter, creating a lock.

3. The vascular access device adapter of claim 2, wherein the fitting is configured to engage a male luer lock on the separate access device.

4. The vascular access device adapter of claim 1, wherein the fitment is removably secured by an interference fit.

5. The vascular access device adapter of claim 1, wherein the fitment is secured by an adhesive.

6. The vascular access device adapter of claim 1, wherein the fitment is secured by a threaded connection.

7. The vascular access device adapter of claim 1, wherein the fitting is a female fitting integrally formed to the proximal end of the cylindrical housing body and projecting proximally from the cylindrical housing body, the female fitting having an open elongate tip, the open elongate tip having a concentric lumen defining an interior flow path of the female fitting, the female fitting having an outside surface, the outside surface having a taper extending in a proximal direction; and
    wherein the cylindrical housing body is configured to correspond to a plurality of jaws of a cylindrical retainer clip, the plurality of jaws formed to a proximal end of the retainer clip,
    wherein the cylindrical retainer clip forms an interference fit with an inner sidewall of a sample collection device.

8. The vascular access device adapter of claim 7, wherein the cylindrical housing body comprises a venting feature configured to remove air from the vascular access device adapter.

9. The vascular access device adapter of claim 7, wherein the female fitting is a threaded fitting, the threaded fitting connecting to a corresponding threaded receptor of a separate access device.

10. The vascular access device adapter of claim 7, wherein the female fitting is a slip receptor, the slip receptor corresponding to a slip fitting of a separate access device, the slip fitting having a conical shape;

wherein the female fitting and the slip receptor are removably pressed and held together with an interference fit.

11. The vascular access device adapter of claim 7, wherein the female fitting is a locking fitting, the locking fitting connecting to a corresponding locking receptor of a separate access device;

wherein the locking fitting and the corresponding locking receptor are removably secured by pressing the locking fitting into the corresponding locking receptor and twisting the female fitting, creating a lock.

12. The vascular access device adapter of claim 7, wherein the housing body further comprises a ridge, the ridge being configured to correspond to the plurality of jaws.

13. The vascular access device adapter of claim 7, further comprising a plurality of ribs extending from the proximal end partially along the housing body, and the ribs are configured to correspond to the plurality of jaws.

14. The vascular access device adapter of claim 1, wherein the end cap comprises a venting feature configured to remove air from the vascular access device adapter.

15. A blood draw kit comprising:

the vascular access device adapter of claim 1; and, a sample container collection device comprising a cylindrical body having an inner sidewall, an open first end and a second end, the second end having a bottom wall from which a concentrically placed male connector projects distally from the cylindrical body, the open first end defining an opening that extends to the bottom wall, the bottom wall having an integrally disposed hollow small gauge needle, the integrally disposed hollow small gauge needle having a lumen, the lumen and an aperture of the concentrically placed male connector defining a collection device channel; and a flush syringe having a compatible male fitting for removable attachment to the fitting of the vascular access device adapter, the fitting of the vascular access device adapter being female, the compatible male fitting comprising an attachment portion including an interior surface defining an inner dimension sized to attach the compatible male connector to the cylindrical housing body forming a fluid-tight connection, wherein the hollow small gauge needle punctures the cylindrical self-healing puncturable septum of the vascular access device adapter, allowing fluid to flow from the flush syringe through the greater flow channel of the vascular access device adapter to the collection device channel.

16. The blood draw kit of claim 15, wherein the sample container collection device further comprises a protective elastomeric sleeve covering the hollow small gauge needle; the protective elastomeric sleeve being integrally joined to the bottom wall, the elastomeric sleeve having a restorative force.

17. The blood draw kit of claim 16, wherein the slip fit counteracts the restorative force such that the vascular access device adapter remains stationary.

18. The blood draw kit of claim 15, further comprising:
a catheter comprising an introducer needle and a female connector adapted to receive the concentrically placed male connector of the sample container collection device in a fluid-tight connection.

19. The blood draw kit of claim 15, further comprising:
a cylindrical blood collection tube comprising a liquid tight compartment and a puncturable septum, wherein the hollow small gauge needle punctures the puncturable septum of the cylindrical blood collection tube, allowing fluid to flow from the collection device channel of the sample container collection device to the liquid tight compartment.

20. A vascular access device adapter comprising:
a cylindrical housing body, the cylindrical housing body having a proximal end, a distal end, an outer housing sidewall and an aperture defining an interior flow channel;

a fitting integrally formed to the proximal end of the cylindrical housing body and projecting proximally from the cylindrical housing body, the fitting having a concentric lumen defining an interior flow path of the fitting, the fitting connecting to a corresponding fitting of a separate access device;

an end cap having a concentric proximal opening, a distal wall, an inner sidewall, an outer sidewall, and a concentric aperture extending from the proximal opening to the distal wall, the concentric aperture defining an end cap interior, the distal wall having a concentric hole extending therethrough; and a cylindrical self-healing puncturable septum having a proximal portion and a distal portion, the proximal portion having a smaller diameter than a diameter of the distal portion, and a transition from the proximal portion to the distal portion defining a ridge, wherein the interior flow channel and the concentric lumen define a greater flow channel, wherein the cylindrical housing body is disposed within the end cap, the inner sidewall of the end cap and the outer housing sidewall of the cylindrical housing body creating a fitment, wherein the cylindrical self-healing puncturable septum is disposed on the distal end of the housing body and within the concentric aperture of the end cap, the end cap enclosing the cylindrical self-healing puncturable septum, the ridge abutting the distal end of the cylindrical housing body, creating a seal, and wherein the end cap is configured to removably secure the vascular access device adapter to an inner housing of a sample container collection device and the end cap further comprises a plurality of ribs disposed on the outer sidewall of the end cap, the plurality of ribs creating a slip fit with an inner wall of the sample container collection device.

* * * * *